(12) United States Patent
Chmielewski et al.

(10) Patent No.: US 10,590,251 B2
(45) Date of Patent: Mar. 17, 2020

(54) HEAT STABILIZED SOFT EXPANDABLE SEALANT COMPOSITIONS

(71) Applicant: Zephyros, Inc., Romeo, MI (US)

(72) Inventors: Craig Chmielewski, Shelby Township, MI (US); Abraham Kassa, Shelby Township, MI (US); Justin Kaffenberger, Livonia, MI (US)

(73) Assignee: ZEPHYROS, INC., Romeo, MI (US)

( * ) Notice: Subject to any disclaimer, the term of this patent is extended or adjusted under 35 U.S.C. 154(b) by 0 days.

(21) Appl. No.: 14/304,012

(22) Filed: Jun. 13, 2014

(65) Prior Publication Data

US 2014/0378567 A1    Dec. 25, 2014

Related U.S. Application Data

(60) Provisional application No. 61/837,832, filed on Jun. 21, 2013.

(51) Int. Cl.
| | | |
|---|---|---|
| C08J 9/04 | (2006.01) | |
| C08J 9/06 | (2006.01) | |
| C08J 9/00 | (2006.01) | |

(52) U.S. Cl.
CPC ......... *C08J 9/0061* (2013.01); *C08J 2323/02* (2013.01); *C08J 2361/10* (2013.01); *C08J 2365/02* (2013.01)

(58) Field of Classification Search
None
See application file for complete search history.

(56) References Cited

U.S. PATENT DOCUMENTS

| | | | |
|---|---|---|---|
| 2,701,895 A | 2/1955 | Tawney | |
| 4,311,628 A | 1/1982 | Abdou-Sahet et al. | |
| 4,423,163 A | 12/1983 | Doerge | |
| 5,162,428 A | 11/1992 | Katoh | |
| 5,266,133 A * | 11/1993 | Hanley | B60R 13/08 156/308.4 |
| 5,977,271 A | 11/1999 | McKay et al. | |
| 6,838,509 B2 | 1/2005 | Shimo et al. | |
| 6,846,559 B2 * | 1/2005 | Czaplicki | C08F 283/10 428/301.4 |
| 7,199,165 B2 | 4/2007 | Kassa et al. | |
| 7,313,865 B2 | 1/2008 | Czaplicki et al. | |
| 2002/0128336 A1 * | 9/2002 | Kolb | C08J 9/0066 521/50 |
| 2004/0076831 A1 | 4/2004 | Hable et al. | |
| 2006/0149000 A1 * | 7/2006 | Ikuta | C08F 291/00 525/343 |
| 2006/0229402 A1 * | 10/2006 | Varma | B65D 39/0011 524/490 |
| 2013/0274360 A1 * | 10/2013 | Hough | C08L 9/00 521/136 |

FOREIGN PATENT DOCUMENTS

| | | |
|---|---|---|
| EP | 1790554 A | 5/2007 |
| WO | 98/50458 | 11/1998 |

OTHER PUBLICATIONS

International Search Report and Written Opinion dated Dec. 5, 2014 (Appln. No. PCT/US2014/042269).
PCT Written Opinion of the International Preliminary Examining Authority dated Jul. 8, 2015.

* cited by examiner

*Primary Examiner* — Kara B Boyle
(74) *Attorney, Agent, or Firm* — The Dobrusin Law Firm, P.C

(57) ABSTRACT

Soft, heat activated sealant compositions heat stabilized through the addition of a phenolic resin to provide a uniform volume expansion over a wide range of temperatures are disclosed.

20 Claims, 2 Drawing Sheets

Sample 9 at 350° F

Sample 8 at 400° F

Sample 8 at 350° F

Sample 6 at 350° F

HEAT STABILIZED SOFT EXPANDABLE SEALANT COMPOSITIONS

FIELD OF THE INVENTION

The present invention relates generally to improved soft, foamed polymer compounds, and more particularly to improved soft, foamed polymer compounds used for sealing, baffling, vibrational and acoustical damping.

BACKGROUND OF THE INVENTION

For many years industry, and particularly the transportation industry, has been concerned with designing compositions that function to provide sealing, baffling, vibrational and acoustical damping to articles of manufacture such as transportation vehicles (e.g. automotive vehicles). Cavities resulting from design and assembly of transportation vehicles allow the movement of such things as sound, water and debris to the detriment of the vehicle and passengers. Numerous solutions to the sealing of such cavities have been proposed. One such solution is the attachment of preformed, heat activatable foamable parts to the inside or near vicinity of the cavities. Typically these parts rely on an external heat source to activate a foaming agent inside the preformed part, causing it to expand and completely, or near completely, and fill the targeted cavity. In automotive applications, a preformed sealant is installed during body assembly, where the assembled body is then dipped in an e-coat bath and guided through an oven to dry and cure the corrosion resistant e-coat coating. In this example, the preformed sealant has been designed to expand and cure when exposed to the e-coat oven heat. One design difficulty in these automotive applications arises from differences in oven temperature (between ovens or within an oven) and differences in heat exposure time. It would therefore be desirable for sealant compositions utilized in such applications to exhibit one or more properties that allow the compositions to expand consistently and uniformly over a wider range of bake times and temperatures.

Phenolic resin compositions themselves are well known and used as resinous based materials for heat stable parts in a wide range of industries. For example, in U.S. Pat. No. 5,162,428, novolac and resole type phenolic resins are combined to make molding materials with high strength and good heat and dimensional stability for the molding of automotive mechanical parts. U.S. Pat. No. 6,838,509 provides for phenolic resin composite materials composed of a phenolic resin, a filler and an organized clay layer which provides heat resistance and mechanical strength for components in the automotive and aerospace industries. However, phenolic resin compositions have not been traditionally used as foamed sealers or as stabilizers of foam sealers such as those described by the present invention.

Phenolic resins and phenolic resin compositions may be foamed through the addition of chemical blowing agents such as those described in U.S. Pat. No. 4,423,163 and International Publication WO 98/50458. However, such uses have not previously been described to include the use of phenolic resins to stabilize polyolefin based foam compositions at high temperatures.

Phenolic resins are also known to chemically crosslink polyolefin-based elastomers containing unsaturation. For example, in U.S. Pat. No. 2,701,895 the curing of polyisobutylene thermoset elastomer compounds is disclosed using a phenolic type resin. Phenolic resins are also used to crosslink the unsaturated portion of blends of saturated and unsaturated polyolefins, leading to the formation of thermoplastic elastomers or thermoplastic vulcanizates as described by U.S. Pat. Nos. 4,311,628 and 5,977,271. In either case of phenolic cured thermoset elastomers or thermoplastic elastomers, they may be foamed. However, the function of the phenolic resin is as the primary crosslinking agent.

It is thus desirable for sealant compositions utilized in applications with variable temperatures to exhibit one or more properties that allow the compositions to expand consistently and uniformly over a wide range of bake times and temperatures. Additionally, it is typically desirable for these compositions to exhibit one or more properties that allow the compositions to be more functional and more easily processed. The present invention meets some or all of the above needs by providing for the addition of a phenolic resin to form a more heat stable soft polymer expandable foam composition for use in such applications.

SUMMARY OF THE INVENTION

Accordingly, the present teachings describe a heat stable soft polymer foam composition. The soft foam composition of the present invention will uniformly expand upon exposure to temperatures over a wide range, and will resist the tendency to buckle when place on a metal surface and exposed to high temperatures.

The present teachings provide for an expandable composition comprising a polymeric mixture and a phenolic resin. The polymeric mixture may include one or more heat activated blowing agents or blowing agent activators so that the composition expands 100% to 3000% above its original volume when exposed to any temperature in the range of from about 300° F. to about 375° F. Prior to expansion, the polymeric mixture is preferably soft, tacky, and has a Shore A hardness of less than 30. The phenolic resin stabilizes the composition during expansion so that the composition retains at least the same expansion level when exposed to temperatures in the range of from about 376° F. to about 450° F. as it does when exposed to temperatures within the range of from about 300° F. to 375° F.

The present teachings further provide for an expandable composition comprising a polymeric mixture which includes one or more alpha olefin based polymers, one or more peroxide-based curing agents and peroxide co-agents or activators, and one or more heat activated blowing agents or blowing agent activators so that the composition expands 100% to 3000% above its original volume when exposed to any temperature in the range of from about 300° F. to about 375° F. The expandable composition further includes a phenolic resin which may be a phenol-formaldehyde resole based resin. The composition may include from about 25% to about 45% by weight polymeric mixture and from about 0.5% to about 2.0% of phenolic resin.

The composition is preferably comprised of a polymeric mixture, blowing agents, peroxide curatives, additives and a phenolic resin. The polymeric mixture may include one or more of a variety of different polymers such as thermoplastics, thermoset or thermosetable polymers, plastics, plastomers, elastomers or combinations thereof. The blowing agents could be chemical or physical blowing agents, heat activated or activated otherwise and could include accelerators or retarders. The peroxide curatives may include one or more different type of peroxide chemistries, co-agents, accelerators or retarders. Additives include extender oils, fillers, processing aides, anti-oxidants, adhesion promoters or combinations thereof.

The foam composition includes improved physical properties over existing materials for use in the sealing and baffling of cavities. These improved physical properties may include but are not limited to uniform expansion over a wide temperature range to account for varying temperatures during activation. The composition of the present teachings may also resist the tendency to buckle when place on a surface (e.g., a metal surface).

DETAILED DESCRIPTION

Figure 1:
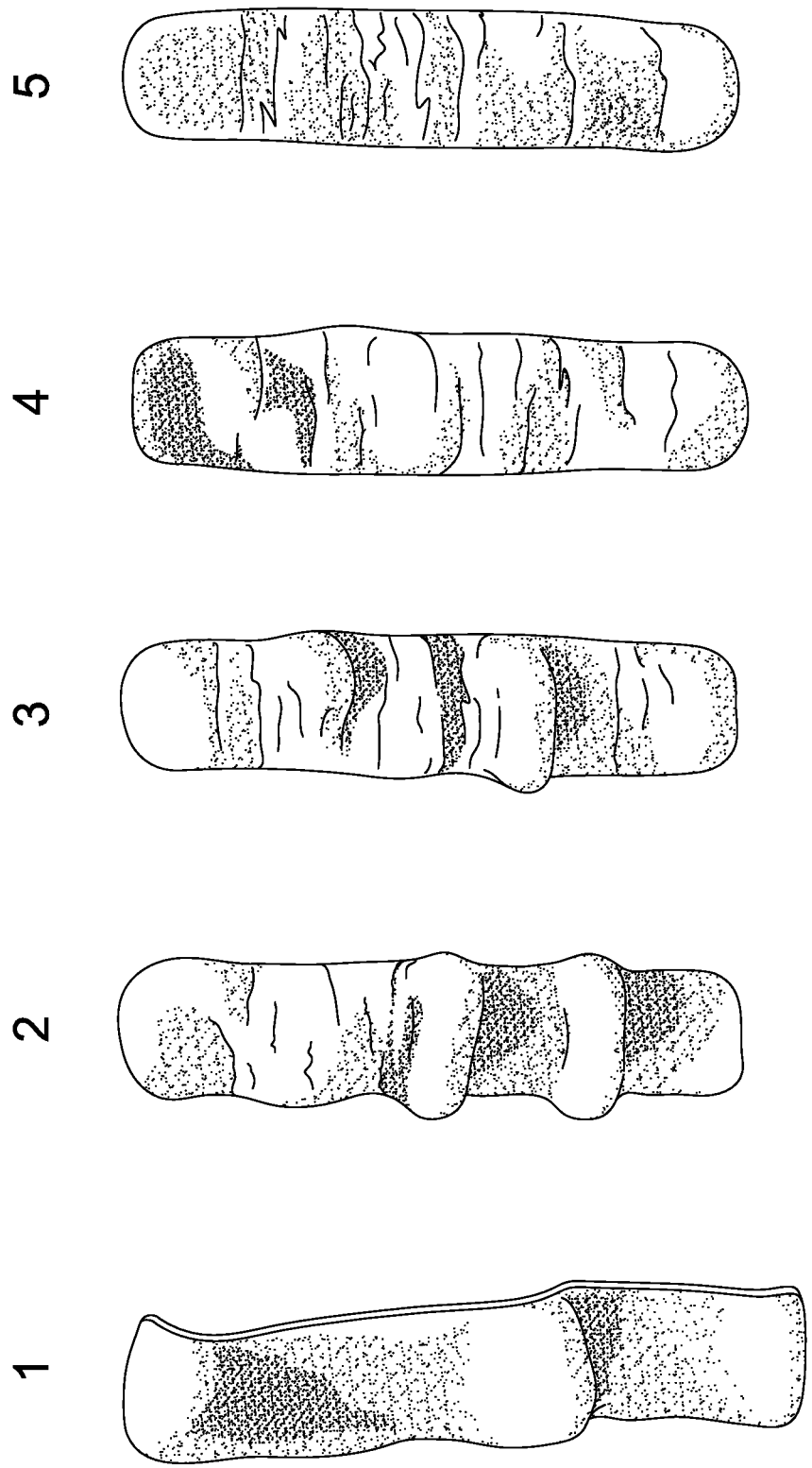
FIG. 1 shows reference panels for measuring buckling test results.

This application is related to and claims the benefit of the filing date of U.S. Provisional Application Ser. No. 61/837,832 filed Jun. 21, 2013, the contents of this application being hereby incorporated by reference for all purposes. This application also relates to U.S. application Ser. No. 23/924,827 filed Jun. 24, 2013. The contents of this application is incorporated by reference herein for all purposes The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings are predicated upon provision of an improved foam material, the method of making the foam material, and use of the improved foam material. The foam material is typically employed for providing uniform sealing or baffling to cavity structures. The foam is preferably a soft polymeric expandable foam wherein the foam includes a phenolic resin which improves the expansion capability of the foam over a wide range of activation temperatures.

The expandable foam composition comprises a polymeric mixture and a phenolic resin. The polymeric mixture may include one or more heat activated blowing agents or blowing agent activators so that the composition expands 100% to 3000% above its original volume when exposed to any temperature in the range of from about 300° F. to about 375° F.

The polymeric mixture of the present invention typically includes one or more polymeric materials, which may be provided as resins or otherwise. The polymeric materials of the polymeric mixture may include elastomers, elastomers, plastics, thermoplastics, thermoset or thermosettable polymers, or any combination thereof. It should be recognized that the polymer ingredients may be homopolymers, copolymers, or combinations thereof. The composition of the invention may include up to about 95% by weight polymeric mixture, or as little as about 5% by weight polymeric mixture. Preferably the composition includes between about 5% and about 85% by weight polymeric mixture, more preferably between about 10% and about 55% by weight polymeric mixture, and still more preferably between about 25% and about 45% by weight polymeric mixture.

The polymeric mixture of the present teachings may include a substantial portion of a thermoplastic material. Preferred thermoplastic materials may include polyolefins, including copolymer and terpolymers containing ethylene, for example, ethylene vinyl acetate copolymers, ethylene ethyl acrylate, ethylene vinyl acetate-glycidal methacrylate, ethylene acrylate-maleic anhydride, ethylene propylene copolymers, and combinations thereof. Also, certain block copolymers such as styrene butadiene block copolymers may be suitable. Copolymers and terpolymers containing polyvinyl chloride may also be utilized. Preferred thermosetting polymeric mixtures for use in the present invention are epoxies, acrylates, polyurethanes and combinations thereof.

Typically, the polymeric mixture includes one or more ethylene-propylene-diene monomer elastomers (EPDM). Preferably between about 60% and about 80% of the EPDM is relatively high in ethylene content and includes greater than 40% by weight ethylene content, more preferably greater than 55% by weight ethylene content and still more preferably greater than 65% by weight ethylene content. Moreover, the overall expandable polymer composition preferably includes less than 18% by weight EPDM, more preferably between about 4% and 13% by weight EPDM and still more preferably between about 6% and 11% by weight EPDM. Examples of preferred ethylene-propylene rubbers are sold under the trade name Royalene®, such as grade Royalene® 301T, and Trilene®, such as grade Trilene® 67, both commercially available from Lion Copolymer LLC, Baton Rouge, La.; Vistalon™ EPDM rubber, such as grade Vistalon™ 7001, commercially available from Exxon Mobil Chemical, Houston, Tex.; and Keltan® EPDM rubber commercially available from Lanxess, Pittsburgh, Pa. EPDM rubber is also commercially available as a dense solid bale, such as Royalene® 301T, as solid pellets, such as Vistalon™ 7001, or as a high viscosity liquid, such as Trilene® 67. The presence of EPDM rubber in the polymeric mixture provides benefits prior to, during and subsequent to heat activation of the soft, foamed sealant composition. As an example, prior to chemical cross-linking, EPDM rubber has sufficiently low molecular weight to aid in the tack of the green state sealant material. During heat activation, chemical agents included in the tacky expandable polymer composition crosslink the EPDM, causing it to build molecular weight and trap gas being released during heat activation of the chemical blowing agents which are also included in the tacky expandable polymer composition. This gas trapping ability is the primary mechanism by which the tacky expandable polymer composition expands and increases it volume several orders of magnitude. Subsequent to heat activation, the cross linked EPDM rubber locks the expanded shape of the tacky expandable polymer composition in place, preventing it from further flowing, sagging or deflating. The EPDM component is also, at least partially, responsible for the retained softness of the tacky expandable polymer composition.

The polymeric mixture also typically includes one or more ethylene copolymer and ethylene terpolymer thermoplastics. Of the ethylene containing thermoplastics themselves, preferably between about 60% and about 80% have a relatively high melt flow rate, as measured by ASTM test method D 1238 (190° C./2.16 kg). The melt flow rate may be greater than 20 g/10 min, more preferably greater than 30 g/10 min and still more preferably greater than 40 g/10 min. The overall composition of the tacky expandable polymer preferably includes less than about 20% by weight of an ethylene containing thermoplastic, more preferably between about 4% and about 15% by weight or even between about 6% and about 10% by weight of an ethylene containing thermoplastic. Examples of preferred ethylene copolymers are ethylene vinyl acetate (EVA) copolymers sold under the trade name Elvax®, such as grade Elvax® 40W, commercially available from DuPont Packaging and Industrial Polymers, Wilmington, Del.; Escorene™ EVA copolymers, commercially available from Exxon Mobil Chemical, Houston, Tex.; and Ateva® EVA copolymers commercially available from Celanese, Edmonton, AB, Canada. The amount of vinyl acetate monomer in the EVA copolymers is preferably greater than 18% by weight, more preferably between about 25% by weight and 32% by weight, or even between about 35% by weight to about 45% by weight vinyl acetate monomer. Other examples of ethylene copolymers typically included in the polymeric mixture are acrylic thermoplastics (e.g. acrylate copolymer), a copolymer of methyl acrylate, ethylene acrylate or butyl acrylate or a combination thereof. It is contemplated that the acrylate polymer is less than 15% by weight of the expandable polymer composition, preferably between about 3% and about 12% by weight of the expandable polymer composition and still more preferably between about 5% and about 9% by weight of the expandable polymer composition. Examples of preferred copolymer of ethylene and butyl acrylate is sold under the trade name LOTRYL®, such as the grade LOTRYL® 35 BA 40, commercially available from Atofina Chemicals, Inc., Philadelphia, Pa.; and Elvaloy® AC Resins, such as grade Elvaloy® AC 34035, commercially available from DuPont Packaging & Industrial Polymers, Wilmington, Del. The amount of acrylate monomer in the ethylene acrylate copolymers is preferably greater than 9% by weight, more preferably between about 13% and about 30% by weight and still more preferably between about 18% and about 24% by weight.

The presence of ethylene copolymers in the polymeric mixture provides benefits to both the flow and tack of the expandable polymer composition. Melt flow rates as discussed above allow for improved overall flow properties of the tacky expandable polymer composition and allow for improved wet-out of the adhering surface. In addition, the co-monomer opposite the ethylene monomer, e.g. vinyl acetate or butyl acetate, promotes good adhesion to a wide variety of substrates, in particular steel and other metallic substrates.

In addition, the polymeric mixture also may contain one or more ethylene terpolymers. The terpolymers may contain ethylene monomer, a second monomer chosen from either vinyl acetate or acrylate chemical families, such as methyl acrylate, ethyl acrylate or butyl acrylate, and a third, chemically reactive, monomer. The identity of this tertiary monomer can be, but is not limited to the chemical families of carboxylic acids, anhydrides, such as maleic anhydride and its modifications, and glycidyl or epoxide groups and their variations, such as glycidyl methacrylate. It is contemplated that the reactive monomer is included in the terpolymers at levels less than 20% by weight of the terpolymer composition, preferably between about 1% and about 15% by weight of the terpolymer composition and still more preferably between about 3% and about 10% by weight of the terpolymer composition. The presence of ethylene terpolymers in the polymeric mixture provides benefits to the expandable polymer composition which are similar to those provided by the ethylene copolymers, such as improved flow, wet-out and tack, with the reactive monomer providing potential additional tack benefits. The additional reactive monomer has the potential of imparting additional non-covalent adhesion to the targeted substrate, as well as having the potential to interact chemically, i.e. forming a covalent bond, with the substrate, further strengthening the overall adhesion of the tacky expandable polymer composition to a substrate.

The polymer mixture may include one or more halogenated elastomers or rubbers, (e.g. a brominated, chlorinated or fluorinated elastomer). It is contemplated that the halogenated elastomer may be provided as a liquid or otherwise. Preferably the composition includes up to or greater than about 15% by weight of a halogenated elastomer, more preferably between about 1% and about 10% by weight of a halogenated elastomer and still more preferably between about 2% and about 4% by weight of a halogenated elastomer. One exemplary suitable halogenated elastomer is a brominated elastomer that is derived from a copolymer of isobutylene and p-methyl styrene. Such an elastomer is sold under the trade name EXXPRO®, commercially available from Exxon Mobil Chemical, Houston, Tex. Another exemplary suitable halogenated elastomer is a brominated elastomer that is derived from a copolymer of isobutylene and isoprene. Such an elastomer is sold under the trade name Lanxess Bromobutyl, commercially available from Lanxess, Pittsburgh, Pa. The viscosity of the halogenated elastomer is preferably less than 65 MU as measured by Mooney Viscosity using ASTM test method D 1646 (ML (1+8) 125°). The viscosity may be less than 45 MU or even less than 35 MU. The benefits of inclusion of the halogenated elastomer to the polymeric mixture may be similar to those benefits derived from the addition of the EPDM rubber. These benefits occur prior to, during and subsequent to heat activation of the soft, foamed sealant composition. Prior to chemical cross-linking, the halogenated rubber has sufficiently low molecular weight to improve the tack of the green state sealant material. Moreover, the halogen portion of the halogenated elastomer promotes improved adhesion to a wider variety of substrates, especially steel and other metallic materials, beyond what would be expected from EPDM alone. During heat activation, chemical agents included in the expandable polymer composition crosslink the halogenated rubber, causing it to build molecular weight and trap gas being released during heat activation of the chemical blowing agents that are may be present in the expandable polymer composition. This gas trapping ability is the primary mechanism by which the expandable polymer composition expands and increases in volume several orders of magnitude. Subsequent to heat activation, the cross linked halogenated rubber assists with locking the expanded shape of the expandable polymer composition in place, preventing it from further flowing, sagging or deflating. The halogenated rubber may also assist in maintaining the softness of the expandable polymer composition.

In addition, the polymeric mixture may include one or more polybutenes, such as poly(1-butene), poly(iso-butylene) or copolymers of butane and isobutylene. When included, the polybutenes may be present in an amount of less than 30% by weight of the expandable polymer composition, more preferably between about 5% and about 25% by weight of the expandable polymer composition, between about 10% and about 22% by weight of the expandable polymer composition, or even between about 14% and about 18% by weight of the expandable polymer composition.

Examples of preferred polybutenes are sold under the trade name Indopol®, such as grade Indopol® H-1500, available through INEOS Oligomers, League City, Tex.; and Polyisobutylene TPC-1285 commercially available from Texas Petrochemicals LP, Houston Tex. The presence of polybutenes in the polymeric mixture provides benefits to both the flow and tack of the expandable polymer composition. The room temperature liquid state of the polybutenes allow for improved overall flow properties of the expandable polymer composition and allow for improved wet-out of the adhering surface. In addition, the low molecular weight of the polybutenes allow for excellent tack to the adhering surface.

It is also contemplated that the polymeric mixture may include one or more polymer submixtures. Such submixtures, when included, are preferably present in the expandable polymer composition in an amount of less than 15% by weight of the expandable polymer composition, more preferably between about 1% and about 10% by weight of the expandable polymer composition and even more preferably between about 2% and about 6% by weight of the expandable polymer composition. The submixture may include an elastomer mixed (e.g., compounded, blended, reacted or the like) with another polymer such as a plastic, a thermoplastic, a second elastomer or the like. One highly preferred submixture includes an elastomer or butylene based material such as polyisobutylene and a styrenic material such as polymethylstyrene.

The phenolic resins of the present invention are made by a reaction of formaldehyde with phenol and substituted phenol. The phenol-formaldehyde resins may result from a polymerization using an alkaline catalyst and excess formaldehyde, resulting in chemical structures that have methylol side and/or end groups. Those skilled in the art refer to these types of phenol-formaldehyde resins as resoles. It is contemplated that the phenolic resin, or combination of phenolic resins, is included in the expandable polymer composition at levels less than about 10% by weight of the expandable polymer composition, preferably between about 0.01% and about 7% by weight of the expandable polymer composition and still more preferably between about 0.1% and about 4% by weight of the expandable polymer composition. One preferred exemplary resole based phenolic resin is sold commercially under the trade name SP-1045 by the SI Group, Inc., Schenectady, N.Y. Alternatively, the phenolic resole resin may contain a halogen (e.g. bromine, chlorine, etc.). An exemplary resole based phenolic resin which contains a halogen (i.e. bromine) is sold commercially under the trade name SP-1055, also by the SI Group, Inc. The purpose of the phenolic resin inclusion in the expandable composition is to stabilize the volume expansion, allowing the composition to retain at least its same expansion level when baked at temperatures in the range of 376 to 450° F. as it does when baked within the temperature range of 300 to 375° F., and to stabilize the composition's adhesion to a metal substrate, resulting in substantially no waviness or buckling of the expanded composition and substantially 100% adhesive coverage of the expanded composition on the substrate when the composition is baked on a metal substrate at any temperatures in the range of 300 to 450° F.

It is contemplated that the composition of the present invention may include one or more reinforcement materials for improving properties such as strength, stiffness, sag resistance, flow control of the like of the composition. While various reinforcement materials may be employed, preferred reinforcement materials are fiber materials which may be dispersed within the composition. The expandable composition of the present invention may include up to about 10% by weight reinforcement material and as little as 0.001% by weight reinforcement material. The expandable composition may include between about 0.008% by weight and about 5% by weight reinforcement material, between about 0.1% and about 3% by weight reinforcement material or even between about 1% and about 3% by weight reinforcement material.

As an example, the composition may include fibers (which may be organic fibers). Examples of such fibers include, without limitation, polyamide (e.g. nylon, aromatic polyamide and polyamideimide) fibers, aramid fibers, ceramic fibers, polyester fibers, glass fibers, silicon carbide fibers, alumina fibers, titanium fibers, steel fibers, carbon fibers and graphite fibers, or combinations thereof. It is also contemplated that reinforcement fabrics may be formed of the fibers discussed herein or other fibers as well. One exemplary aramid fiber is sold under the trade name Kevlar® Aramid Pulp, such as grade Kevlar® 1F543, commercially available from DuPont Advanced Fibers Systems, Richmond, Va.

If desired, the composition of the present invention may be activatable to expand, foam or both and may include one or more blowing agents for at least assisting the activation of the composition. The blowing agents may be pressure activated, heat activated, chemically activated, or radiation activated. In a preferred embodiment, the blowing agent is heat activated. Exemplary heat-activated blowing agents may include one or more nitrogen containing groups such as amides, amines or combinations thereof. Examples of suitable blowing agents include azodicarbonamide, dinitrosopentamethylenetetramine, 4,4-oxy-bis(benzenesulphonylhydrazide), trihydrazinotriazine and N,N-dimethyl-N,N-dinitrosoterephthalamide.

An accelerator for the blowing agents may also be provided in the expandable material. Various accelerators may be used to increase the rate at which the blowing agents form gasses (e.g. inert gasses). One preferred blowing agent accelerator is a metal salt, or is an oxide, e.g. a metal oxide, such as zinc oxide. One exemplary zinc oxide is a powder sold under the trade name Kadox® 930, commercially available from Horsehead Corporation, Monaca, Pa. Other preferred accelerators include zinc stearate, modified and unmodified urea, adipic and benzoic acids, modified and unmodified thiazoles or imidazoles, and amines and amides. Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents and blowing agent accelerators in the expandable material range from about 0.0001% by weight to about 10% by weight, but preferably in the range of about 0.001% to about 8% by weight and even more preferably in the range of about 0.1% to about 8% by weight of each component. Most preferred blowing agents produce a volumetric expansion from about 25% to about 2000% by volume, and more preferably from about 700% to about 1500% by volume. The preferred blowing agent is fully activated at about 50° C. to about 200° C. A blowing agent promoter such as a surface coated urea, for example BIK® OT available from Chemtura Corporation, Middlebury, Conn., may also be included (e.g., in a concentration of from about 0.005% to about 1.0% by weight). Still another preferred blowing agent accelerator is a multi-functional amine, dicyandiamide, sold under the trade name Amicure® CG1200G by Air Products and Chemicals, inc., Allentown, Pa.

The expandable composition described herein typically includes one or more primary curing (e.g., crosslinking, vulcanizing or the like) agents. Any suitable curing agent, or combination of curing agents, may be employed in the composition and the amount of curing agent may vary widely depending upon desired reaction rates. It is contemplated that the reactive curing agent, or combination of curing agents, is included in the expandable composition at levels less than 10% by weight of the expandable polymer composition, preferably between about 0.01% and about 7% by weight of the expandable polymer composition or even between about 0.1% and about 4% by weight of the expandable polymer composition. The curing agent may comprise one or more materials from the chemical family of peroxides. Acceptable chemical classes of peroxides include, but are not limited to, those taken from the dialkyls, peroxyketals, diacyls and peroxyesters. One exemplary peroxide from the class of peroxyketals is the curing agent 1,1-bis(t-butylperoxy)-3,3,5-trimethylcyclohexane which, when prepared on an inert filler, is sold under the trade name Varox®231XL, commercially available from the R.T. Vanderbilt Company, Inc., Norwalk, Conn. Another exemplary peroxide, one form the class of diacyls is dibenzoyl peroxide which, when prepared on an inert filler, is sold under the trade name BP-50-FT, commercially available from United Initiators, Elyria, Ohio; also sold under the trade name Perkadox® CH-50X, commercially available from AkzoNobel, Chicago, Ill. The purpose of the curing agent or agents is to chemically cross link one or more of the polymers comprising the polymer mixture. The activity of the curing agent, that is the time to activation and the temperature of activation, is chosen so to balance the cross linking reaction with the bowing agent activation to maximize the volume increase during expansion of the tacky composition. The cross link reaction results in an overall molecular weight increase of the tacky expandable composition, assisting the composition in trapping the gas released during the activation of the blowing agent, preventing the composition from collapsing once it has expanded, minimizing the sag of the composition under the pull of gravity and assisting with the adhesion of the composition to a substrate.

The composition may also include one or more co-agents which act synergistically with the primary curing agents to control chemical behavior, such as the rate of crosslinking, crosslink density and to enhance chemical, physical, mechanical and adhesion properties of the tacky expandable composition. Acceptable chemical classes of chemical co-agents which act synergistically with peroxides include, but are not limited to, acrylate and methacrylate monomers. In one embodiment, acrylate co-agents may be monofunctional, difunctinoal, trifunctional or have even higher functionality. Preferably a crosslinking acrylic monomer is present in the expandable composition in the amount between about 0.01% to about 3% by weight of the expandable composition, more preferably between about 0.1% and about 1.5% by weight of the composition and still more preferably between about 0.3% and about 0.6% by weight of the expandable composition. One preferred acrylic monomer is a dipentaerythritol pentaacrylate sold under the alphanumeric designation SR-399, commercially available from Sartomer USA LLC, Exton, Pa. Other preferred acrylic monomers are pentaerythritol tetraacrylate, sold under the alphanumeric designation SR-295, and an ethoxylated (4) pentaerythritol tetraacrylate, sold under the alphanumeric designation SR-494, both also commercially available from Sartomer USA LLC. Exemplary alternate acrylic monomers include ditrimethylopropane tetraacrylate and other various ethoxylated and propoxylated acrylate monomers.

The composition of the present invention may also include one or more fillers, including but not limited to particulated materials (e.g. powder), beads, or microspheres. The filler may include a relatively low density material that is generally non-reactive with the other components present in the composition. Examples of fillers include silica, diatomaceous earth, glass, clay, talc, pigments, colorants, glass beads or bubbles, glass, carbon ceramic fibers, antioxidants and the like. Such fillers, particularly clays, can assist the expandable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

One or more mineral or stone type fillers such as calcium carbonate or sodium carbonate may be used as fillers. Silicate minerals such as mica may be used as fillers. When employed, the fillers in the composition can range from about 10% to about 90% by weight of the expandable composition. According to some embodiments, the composition may include from about 0% to about 3% by weight, and more preferably less than 1% by weight clays or similar fillers. Powdered (e.g. about 0.01 to about 50 micron, and more preferably about 1 to 25 micron mean particle diameter) mineral type filler can comprise between about 5% and about 70% by weight, more preferably about 10% and about 50% by weight, and still more preferably about 20% to about 40% by weight of the expandable composition.

The composition typically includes one or more additives (e.g. functional additives) for improving one or more various properties of the composition. As examples, additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids, stabilizers and combinations thereof.

On additive, which may be provided in the composition is an adhesive or tackifier (e.g. a tackifying polymeric mixture) which may be added to the composition for enhancing adhesion, peel strength, or both. The tackifier may be a hydrocarbon based tackifier and more preferably is an aromatically modified C5 or C5:C9 hydrocarbon tackifying polymeric mixture. When included, the tackifying polymeric mixture is less than about 25% by weight of the expandable composition, preferably about 4% to about 20% by weight of the expandable composition and still more preferably between about 8% to about 15% by weight of the expandable composition. One preferred exemplary tackifier based on the polymerization of C5 aliphatic resins is sold under the trade name Wingtack®, such as grade Wingtack® 86, sold commercially by Cray Valley USA LLC, Exton, Pa. A second preferred exemplary tackifier resin also comes from the class of the indene-coumarone resins and sold under the trade name Novares® C, such as grade Novares® C 100 which is produced by the polymerisation of the indene fraction obtained from the distillation of coal tar. Novares® C 100 is commercially available from Rutgers Novares GmbH, Duisburg, Germany.

Another potential additive for the composition is oil which may be paraffinic oil. When included, the expandable composition includes between about 2% and about 30% by weight oil, more preferably between about 5% and about 20% by weight oil and most preferably between about 8% and about 15% by weight oil. One particularly preferred paraffinic oil is sold under the trade name Sunpar®, such as grade Sunpar® 2280, commercially available from Sunoco, Inc., Philadelphia, Pa.

It is also contemplated that the expandable composition may include one or more anti-corrosion agents. Preferably, the expandable composition includes less than about 15% by weigh anti-corrosion agent, more preferably between about 2% and about 10% by weight anti-corrosion agent and still more preferably between about 4% and about 6% by weight anti-corrosion agent. One exemplary anti-corrosion agent is an indene-coumarone polymeric mixture sold under the trade name Cumar®, such as grade Cumar® R-13, commercially available from the Neville Chemical Company, Pittsburgh, Pa.

An exemplary formulation in accordance with the teachings herein is shown below at Table A.

TABLE A

| Ingredient | Preferred parts by weight (pbw) | More preferred parts by weight (pbw) | Most preferred parts by weight (pbw) |
|---|---|---|---|
| Masterbatch of: Brominated Olefin Polymer (11.79 pbw)(e.g., Bromobutyl 2030 from Lanxess) Ethylene Propylene Ethylidene Norbornene Terpolymer (9.82 pbw)(e.g., Trilene 67 from Lion Coploymer) P-Aramide (0.2 pbw) (e.g., Kevlar 1F543 from DuPont) Ethylene-propylene dicyclopentadiene rubber (19.65 pbw) (e.g., Royalene 301T from Lion Copolymer) Ethylene Propylene Copolymer (7.86 pbw)(e.g., Vistalon 7001 from ExxonMobil) Ethylene Vinyl Acetate Copolymer (3.92 pbw) (e.g., Elvax 40W from DuPont) Ethylene Butyl Acrylate Copolymer Blend (19.65 pbw)(e.g., Elvaloy 34035EAC from DuPont or Lotryl 35BA40) Ethylene Acrylate Copolymer (7.86 pbw)(e.g., Elvaloy 4170 from DuPont) Carbon Black (1.18 pbw) (e.g., Raven 410 from Columbian Chemicals) hydrocarbon Resin (18.07 pbw)(e.g., Novares C-100 from Rutgers VFT AG) | 23.5-27.5 | 25-26 | 25.45 |
| Severely Solvent Refined Petroleum Hydrocarbon Oil (e.g., Sunpar 2280 from Sunoco) | 9-13 | 10.5-11.5 | 11.00 |
| Polybutene (Isobutylene/butene copolymer)(Indopol H-1500 from Ineos or TPC 1285 from Texas Petroleum) | 13-17 | 14-16 | 15.00 |
| Modified Polyterpene Type Hydrocarbon Resin (e.g., Wingtack 86 from Sartomer) | 8.5-11 | 9-10.5 | 9.70 |
| Calcium Carbonate (e.g., GPR 325 or GFP 325 from Carmeuse or Hubercar Q325 from Huber) | 26.5-30 | 28-28.5 | 28.16 |
| Azodicarbonamide (e.g., Azofoam VI-30 or VC-30 from Otsuka or Celogen AZ120 from Lion Coplymer) | 5-6.5 | 5.6-6.0 | 5.80 |
| Phenolic Resin(e.g. Resin P-101 from Akrochem) | 0.5-1.5 | 0.9-1.1 | 1.00 |
| Dicyandiamide (e.g., Amicure CG1200G from Air Products) | 0.1-0.3 | 0.15-0.25 | 0.20 |
| Zinc Oxide, Nonferrous Metal Oxide (e.g., Zoco 100 from Zochem or Kadox 930 from Horsehead) | 1-3 | 1.5-2.5 | 2.00 |
| Dipentaerythritol Pentaacrylate (e.g., SR399 from Sartomer) | 0.25-0.5 | 0.38-0.4 | 0.39 |
| 1,1-bis(t-butylperoxy)-3,3,5-trimethyl cyclohexane, carbonic acid calcium salt & calcium silicate (e.g., Luperox 231XL40 from Arkema) | 0.8-1.6 | 1.1-1.3 | 1.20 |
| Dibenzoyl Peroxide & Dicyclohexyl Phthalate (e.g., BP-50-FT from United Initiators) | 0.05-0.15 | 0.08-0.12 | 0.10 |

The expandable composition of the present invention may be prepared according to any suitable technique. The expandable composition may be prepared using conventional batch processing techniques, which will be familiar to those skilled in the art. Briefly, the raw materials are added to a mixer and mixed until fully blended. A planar sheet, strip tape or other structure may then be formed, such as by extruding the tacky expandable composition into the form of a sheet which may then be die cut to a desired shape. Such sheet might have a thickness of from about 0.1 mm to about 5.0 mm. Larger or small thicknesses are also possible. It may also be possible to form a liquid coating composition that employs the present composition.

The expandable composition of the present invention may be applied in nearly any shape to nearly any surface of any substrate. In a preferred application, the composition is contacted with a metal component (adhering to the metal components, which may be a frame or body component) of an article of manufacture (e.g. an automotive vehicle).

EXAMPLES

In the development of expandable materials it has been observed that improving volume expansion at high temperature bakes (460° F.) requires increased levels of co-agent and curative. An increase in these same ingredients, however, has been shown to increase the buckling of the material when baked at 350° F. A series of experimental designs showed that optimization of open panel bake performance necessitated sacrifices in the 400° F. volume expansion and vice versa. To circumvent the limitations, a phenolic resin, was added to the formulation. This ingredient acts as both an adhesion promoter and a curing agent for the EPDM rubber present in the material. The phenolic resin thus permits the use of reduced levels of peroxide curatives so buckling ceases to be an issue, but the additional cure at the higher bake temperatures allows for retention of expansion at higher bake temperatures.

The phenolic resin used for this study, SP-1045 (SI Group Inc.), is an octyl phenol based polymer. It is supplied as a solid flake and has a melting point of 145° F. The relatively polar hydroxyl groups on one end side of the polymer backbone and long non-polar hydrocarbon chains on the other suggests that this molecule has surfactant-like properties which would lend themselves to adhesion promotion to a polar metal surface. Upon heating and in the presence of bromine, the phenolic resin will undergo the formation of a chroman ring with unsaturated sites found in the base polymers like EPDM. This additional cross-linking builds molecular weight, which improves the gas retention capability of the material. The nature of the chroman ring formed in the reaction also lends itself to high temperature stability and will be less prone to thermal degradation.

Volume expansion of all material was tested at 350° F. for 30 minutes and 400° F. for 40 minutes. Volume expansions were also selectively performed at 300° F. for 30 minutes, 315° F. for 25 or 30 minutes, 320° F. for 25 minutes, and 325° F. for 30 minutes. For each run, three 0.25×2.25" specimens were prepared. Samples were randomly placed on the baking sheet to randomize the impact of non-isothermal events in the oven (e.g. opening of oven door during bake). The squirrel index (e.g., measure of buckling) was obtained by baking a 1"×8"×3 mm piece of material on a prepared sheet of G-60 steel. The 4×12" sheet of metal is prepared by sequentially cleaning it with toluene and acetone before evenly spreading 6 drops of Quaker Ferrocote MAL to one side of the panel. The open-faced panels were baked at 350° F. for 30 minutes before assessing the squirrel index. FIG. 1 provides five reference panels for the squirrel index against which all panels are rated.

In the development of the phenolic resin incorporated formula, several batches were made. These formulations and the corresponding results can be found in Table B and Table C. An initial level of 3% phenolic resin was selected. At this level, a significant drop in volume expansion was seen. An attempt was made to decrease the amount of co-agent to try to reduce the degree of cure that the material underwent, but this did not improve the volume expansion. When the phenolic resin level was reduced to 1.0% wt, the volume expansion at both 350° F. and 400° F. exceeded 1150% and there was only a slight bump in the squirrel panel (sample 3 at Table B). After this successful batch, an attempt was made to eliminate the peroxide from the formulation by accelerating the phenolic cure rate with $SnCl_2$. While the volume expansion of this material at 400° F. was nearly passing (817%), the 350° F. bake was poor (286%), suggesting that the phenolic cure rate is slower than that of the peroxide, even with the $SnCl_2$ accelerator.

Table B

TABLE B

|  | Sample 1 | Sample 2 | Sample 3 | Sample 4 |
|---|---|---|---|---|
| Master Batch | 27.70% | 27.70% | 29.40% | 29.40% |
| GPR 4 | 20.60% | 21.20% | 20.70% | 20.70% |
| WingTack 86 | 10.70% | 10.70% | 10.70% | 10.70% |
| SP-1045 | 3.00% | 3.00% | 1.00% | 1.30% |
| SnCl2 | 0.00% | 0.00% | 0.00% | 1.00% |
| Araldite DY 965 | 0.00% | 0.00% | 0.00% | 0.00% |
| Celogen AZ 120 | 5.20% | 5.20% | 5.20% | 5.20% |
| Varox 231-XL | 1.00% | 1.00% | 1.20% | 0.00% |
| Aztec BP-50-FT | 0.10% | 0.00% | 0.10% | 0.00% |
| PLD 3197R | 2.00% | 1.50% | 2.00% | 2.00% |
| Zoco 100 | 2.40% | 2.40% | 2.40% | 2.40% |
| Indopol H-1500 | 16.60% | 16.60% | 16.60% | 16.60% |
| Sunpar 2280 | 10.70% | 10.70% | 10.70% | 10.70% |
| Volume Expansion (350° F./30') | 279% | 233% | 1224% | 286% |
| Volume Expansion (400° F./40') | 697% | 326% | 1177% | 817% |
| S.G. | 1.09 | 1.13 | 1.12 | 1.10 |
| Squirrel (buckling) Index | 5 | 5 | 4 | 5 |

Figure 2:
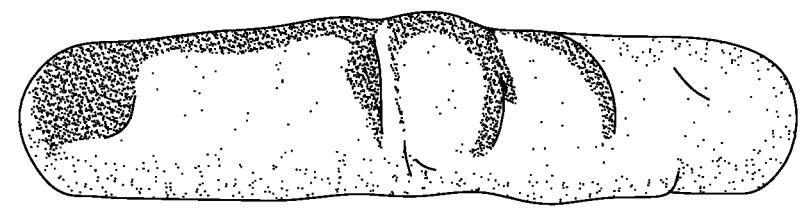
FIG. 2 shows panels of example formulations post-expansion in accordance with the teachings herein.
Figure 2:
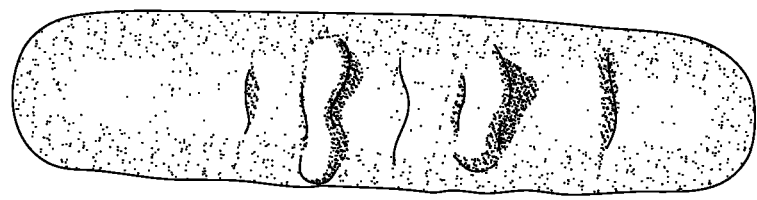
Figure 2:
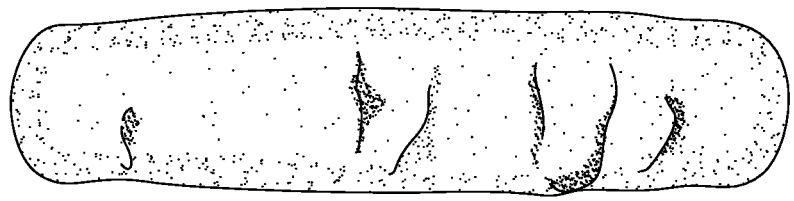
Figure 2:
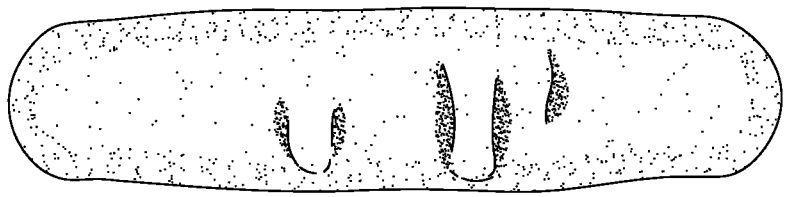

Based upon these results several other samples were made that incorporated a phenolic resin level of 1%. Samples were made with SR-494 in lieu of SR-399. These samples under expanded. Samples were also made by replacing Kevlar with Twaron fiber, eliminating Elvax 40W and Elvaloy 4170 and using Azofoam VI-25 rather than Celogen AZ-120. In all cases, the volume expansion at both 350° F. and 400° F. exceeded 1100% and no buckling was observed in the open panel bake. Photos showing various samples post-expansion can be found at FIG. 2.

TABLE C

|  | Sample 5 | Sample 6 | Sample 7 | Sample 8 | Sample 9 | Sample 10 |
|---|---|---|---|---|---|---|
| Exxpro 3433 | 4.00% | 4.00% | 4.00% | 4.00% | 4.00% | 0.00% |
| Trilene 67 | 2.50% | 2.50% | 2.50% | 2.50% | 2.50% | 0.00% |
| Royalene 301T | 5.00% | 5.00% | 5.00% | 5.00% | 5.00% | 0.00% |
| Vistalon 7001 | 2.00% | 2.00% | 2.00% | 2.00% | 2.00% | 0.00% |
| Kevlar 1F543 | 0.10% | 0.10% | 0.10% | 0.00% | 0.00% | 0.00% |
| Twaron 1099 | 0.00% | 0.00% | 0.00% | 0.10% | 0.10% | 0.00% |
| Elvaloy 34035 EAC | 8.00% | 5.00% | 5.00% | 5.00% | 5.00% | 0.00% |
| Elvax 40W | 0.00% | 1.00% | 1.00% | 1.00% | 0.00% | 0.00% |
| Elvaloy 4170 | 0.00% | 2.00% | 2.00% | 2.00% | 0.00% | 0.00% |
| Novarez C-100 | 4.60% | 4.60% | 4.60% | 4.60% | 4.60% | 0.00% |
| Raven 410 | 0.30% | 0.30% | 0.30% | 0.30% | 0.30% | 0.00% |
| MasterBatcn | 0.00% | 0.00% | 0.00% | 0.00% | 0.00% | 25.45% |
| Azofoam VI-25 | 5.00% | 5.00% | 5.00% | 5.00% | 5.00% | 5.00% |

TABLE C-continued

|  | Sample 5 | Sample 6 | Sample 7 | Sample 8 | Sample 9 | Sample 10 |
|---|---|---|---|---|---|---|
| Wingtack 86 | 9.70% | 9.70% | 10.70% | 9.70% | 9.70% | 9.70% |
| SP-1045 | 1.00% | 1.00% | 0.00% | 1.00% | 1.00% | 1.00% |
| GPR 4 | 24.60% | 24.60% | 23.40% | 23.10% | 26.10% | 24.05% |
| Zoco 100 | 2.40% | 2.40% | 2.40% | 2.40% | 2.40% | 2.40% |
| PLD 3197R | 0.00% | 0.00% | 2.00% | 2.00% | 2.00% | 2.00% |
| SR 494 | 0.50% | 0.50% | 0.50% | 0.00% | 0.00% | 0.00% |
| Varox 231XL | 1.20% | 1.20% | 1.20% | 1.20% | 1.20% | 1.20% |
| Varox DCP40KE | 0.00% | 0.00% | 1.20% | 0.00% | 0.00% | 0.00% |
| Aztec BP-50-FT | 0.10% | 0.10% | 0.10% | 0.10% | 0.10% | 0.10% |
| Amicure CG-1200 | 0.00% | 0.00% | 0.00% | 0.00% | 0.00% | 0.10% |
| Indopol H-1500 | 16.00% | 16.00% | 16.00% | 16.00% | 16.00% | 16.00% |
| Sunpar 2280 | 13.00% | 13.00% | 13.00% | 13.00% | 13.00% | 13.00% |
| V.E. (350° F./30') | Under-expanded | 653% | Under-expanded | 1225% | 1258% | 1287% |
| V.E. 400° F./40') | Not tested | 485% | Not tested | 1182% | 1201% | 1102% |
| S.G. |  | 1.13 |  | 1.13 | 1.16 | 1.13 |
| Squirrel (buckling) Index | Not tested | 5 | Not tested | 5 | 5 | 5 |

With the addition of another curing agent to the formulation, there was concern about the gap jumping ability of the material. To show that the phenolic resin did not negatively impact this property, a 3 mm thick piece of sample 9 was placed between two oiled (MAL) G-60 panels with a 300% gap and baked at 340° F. for 30 minutes. The material exhibited no pull back off the top panel and there were no pinholes in the seal.

Sample 3 was scaled up to the 25 mm twin screw extruder. It was previously shown that the location of the blowing agent during twin screw processing has an impact on the DSC (differential scanning calorimetry) onset and peak temperatures. By moving the blowing agent to the side feed on the twin screw, the shape of the DSC curve could be made to match more closely the results from blade mixed material. It is for this reason that the blowing agent was fed from the side feeder in this trial. The peroxides were moved to the feed throat to keep the peroxides and blowing agent separate. The phenolic resin was added to the feed throat and was added to the formula in place of 1% Wingtack 86.

The resulting material exhibited exceptional open panel bake appearance and had high volume expansion values at 350° F. and 400° F. Lower bake temperature bakes were performed at 300° F., 315° F., 320° F. and 325° F. The material failed to expand when baked less than 325° F. DSC results show that the onset temperature, which is almost exclusively associated with the blowing agent, is higher (~188° C.) in phenolic resin containing samples than it is in the absence of phenolic resin (~185° C.). This suggests either a direct or an indirect interaction between the phenolic resin and the blowing agent.

Plotting squirrel index versus 400° F. volume expansion tended to yield a straight line with a negative slope after a minimum expansion of ~900%. With the addition of just 1% wt phenolic resin however, the onset of the drop off in squirrel index was shifted up to ~1250%, so the material is already passing the 400° F. volume expansion before buckling becomes a problem.

The preferred embodiment of the present invention has been disclosed. A person of ordinary skill in the art would realize, however, that certain modifications would come within the teachings of this invention. Therefore, the following claims should be studied to determine the true scope and content of the invention.

Any numerical values recited herein include all values from the lower value to the upper value in increments of one unit provided that there is a separation of at least 2 units between any lower value and any higher value. As an example, if a is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0,0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the Detailed Description of the Invention of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. By use of the term "may" herein, it is intended that any described attributes that "may" be included are optional.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps. All references herein to elements or metals belonging to a certain Group refer to the Periodic Table of the Elements published and copyrighted by CRC Press, Inc., 1989. Any reference to the Group or Groups shall be to the Group or Groups as reflected in this Periodic Table of the Elements using the IUPAC system for numbering groups.

It will be appreciated that concentrates or dilutions of the amounts recited herein may be employed. In general, the relative proportions of the ingredients recited will remain the same. Thus, by way of example, if the teachings call for 30 parts by weight of a Component A, and 10 parts by weight of a Component B, the skilled artisan will recognize that such teachings also constitute a teaching of the use of Component A and Component B in a relative ratio of 3:1. Teachings of concentrations in the examples may be varied within about 25% (or higher) of the stated values and similar results are expected. Moreover, such compositions of the examples may be employed successfully in the present methods.

It will be appreciated that the above is by way of illustration only. Other ingredients may be employed in any of the compositions disclosed herein, as desired, to achieve the desired resulting characteristics. Examples of other ingredients that may be employed include antibiotics, anesthetics, antihistamines, preservatives, surfactants, antioxidants, unconjugated bile acids, mold inhibitors, nucleic acids, pH adjusters, osmolarity adjusters, or any combination thereof.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

The invention claimed is:

1. A composition comprising:
    a polymeric mixture including one or more ethylene-propylene-diene monomer elastomers (EPDM), the EPDM aiding in tackiness of the composition, and the composition including about 4% to about 13% by weight EPDM;
    about 0.5% to about 2.0% by weight phenol-formaldehyde resin that is present to stabilize the composition upon expansion so that the composition retains at least a same expansion level when exposed to temperatures in a range of from about 376° F. to about 450° F. as it does when exposed to temperatures within a range of from about 300° F. to about 375° F.;
    an ethylene terpolymer for making the composition tacky;
    at least about 0.1% and at most about 7% by weight of a peroxide based curing agent;
    about 0.01% to 3% by weight of an acrylic monomer;
    a latent blowing agent, present in an amount of about 5.0 to about 6.5 parts by weight of the composition, that activates upon exposure to temperatures of about 300° F. to about 450° F. in an e-coat oven;
    wherein the phenol-formaldehyde resin is adapted to form cross-links with the EPDM, upon heating and in the presence of bromine, increasing a molecular weight of the composition;
    wherein the expansion level of the composition, upon exposure to heat, is about 1100% to 3000% above an original volume of the composition prior to expansion; and
    wherein the composition is an expandable foaming composition.

2. The composition of claim 1, wherein the phenol-formaldehyde resin is a non-halogenated dimethylol-p-($C_5$-$C_{10}$ alkyl) phenol.

3. The composition of claim 1, wherein the phenol-formaldehyde resin is a halogenated dimethylol-p-($C_5$-$C_{10}$ alkyl) phenol.

4. The composition of claim 3, wherein the halogen is either bromine or chlorine.

5. The composition of claim 1, wherein the polymeric mixture includes one or more ethylene vinyl acetate copolymers.

6. The composition of claim 1, including one or more aramid fiber fillers.

7. The composition of claim 1, including a handling layer.

8. The composition of claim 1, wherein the peroxide based curing agent is selected from the group consisting of dialkyls, peroxyketals, diacyls, and peroxyesters.

9. The composition of claim 1, further including about 4% to about 20% by weight of the composition of a tackifier additive.

10. The composition of claim 1, further including at least about 10% and at most about 30% by weight polybutene.

11. The composition of claim 1, further including at least 20% by weight calcium carbonate.

12. The composition of claim 1, wherein presence of the phenol-formaldehyde resin permits use of the peroxide based curing agent in the amount of at least about 0.1% and at most about 7% by weight resulting in preclusion of buckling while simultaneously retaining the expansion level of the composition of about 1100% to 3000%.

13. The composition of claim 1, wherein the ethylene terpolymer is present in an amount of about 2.3 to about 2.7 parts by weight of the composition.

14. The composition of claim 1, wherein the peroxide based curing agent is two peroxide based curing agents including a peroxyketal and a dibenzoyl peroxide.

15. A composition comprising:
    a) a polymeric mixture including:
        i) one or more ethylene terpolymers for making the composition tacky for application to a substrate prior to expansion;
        ii) an aramid filler;
        iii) an EPDM rubber present in an amount of about 4% to about 13% by weight of the composition;
    b) a peroxide-based curing agent;
    c) a heat activated latent blowing agent, present in an amount of about 5.0 to about 6.5 parts by weight of the composition, that activates upon exposure to temperatures of about 300° F. to about 450° F. in an e-coat oven;
d) about 0.01% to about 3% by weight of an acrylic monomer;
e) about 0.5% to about 2.0% by weight phenol-formaldehyde resin that stabilizes the composition during expansion so that the composition is adapted to retain at least a same expansion level when exposed to temperatures in a range of from about 376° F. to about 450° F. as it does when exposed to temperatures within a range of from about 300° F. to about 375° F.;

wherein the composition expands when exposed to any temperature in a range of from about 300° F. to about 400° F.;

wherein the expansion level of the composition, upon exposure to heat, is about 1100% to 3000% above an original volume of the composition prior to expansion;

wherein the composition is an expandable foaming composition.

16. The composition of claim 15, wherein the phenol-formaldehyde resin is a phenol-formaldehyde resole based resin.

17. The composition of claim 15, wherein the phenol-formaldehyde resin is a non-halogenated dimethylol-p-($C_5$-$C_{10}$ alkyl) phenol.

18. The composition of claim 15, wherein the phenol-formaldehyde resin is a halogenated dimethylol-p-($C_5$-$C_{10}$ alkyl) phenol.

19. The composition of claim 18, wherein the halogen is either bromine or chlorine.

20. The composition of claim 15, further including at least 20% by weight calcium carbonate.

* * * * *